US010539715B2

(12) United States Patent
Li et al.

(10) Patent No.: US 10,539,715 B2
(45) Date of Patent: Jan. 21, 2020

(54) COMPOSITIONS CONTAINING POLYCARBONATE AND INFRARED REFLECTIVE ADDITIVES

(71) Applicant: BAYER MATERIALSCIENCE LLC, Pittsburgh, PA (US)

(72) Inventors: Xiangyang Li, Seven Fields, PA (US); Rudiger Gorny, Oakdale, PA (US)

(73) Assignee: Covestro LLC, Pittsburgh, PA (US)

( * ) Notice: Subject to any disclaimer, the term of this patent is extended or adjusted under 35 U.S.C. 154(b) by 521 days.

(21) Appl. No.: 14/772,167

(22) PCT Filed: Mar. 11, 2014

(86) PCT No.: PCT/US2014/023021
§ 371 (c)(1),
(2) Date: Sep. 3, 2015

(87) PCT Pub. No.: WO2014/197034
PCT Pub. Date: Dec. 11, 2014

(65) Prior Publication Data
US 2016/0011338 A1    Jan. 14, 2016

Related U.S. Application Data

(60) Provisional application No. 61/775,759, filed on Mar. 11, 2013.

(51) Int. Cl.
| G02B 1/10 | (2015.01) |
| C08L 83/06 | (2006.01) |
| G02B 5/26 | (2006.01) |
| C08L 69/00 | (2006.01) |
| G02B 5/20 | (2006.01) |
| C08K 3/013 | (2018.01) |
| C08G 77/14 | (2006.01) |

(52) U.S. Cl.
CPC .............. *G02B 1/10* (2013.01); *C08K 3/013* (2018.01); *C08L 69/00* (2013.01); *C08L 83/06* (2013.01); *G02B 5/208* (2013.01); *G02B 5/26* (2013.01); *C08G 77/14* (2013.01)

(58) Field of Classification Search
USPC ........ 524/115, 513, 453, 588, 494; 523/200; 252/500, 582; 351/163–165, 44; 554/77; 528/26.5
See application file for complete search history.

(56) References Cited

U.S. PATENT DOCUMENTS

| 2,991,273 A | 7/1961 | Hechelhammer et al. |
| 2,999,835 A | 9/1961 | Goldberg |
| 2,999,846 A | 9/1961 | Schnell et al. |
| 3,028,356 A | 4/1962 | Shepard |
| 3,030,331 A | 4/1962 | Goldberg |
| 3,148,172 A | 9/1964 | Fox |
| 3,169,121 A | 2/1965 | Goldberg |
| 3,271,367 A | 9/1966 | Schnell et al. |
| 3,395,119 A | 7/1968 | Blaschke et al. |
| 3,544,514 A | 12/1970 | Schnell et al. |
| 3,729,447 A | 4/1973 | Haberland et al. |
| 4,255,556 A | 3/1981 | Segal et al. |
| 4,260,731 A | 4/1981 | Mori et al. |
| 4,311,823 A | 1/1982 | Shozaburo et al. |
| 4,369,303 A | 1/1983 | Mori et al. |
| 4,714,746 A | 12/1987 | Serini et al. |
| 4,982,014 A | 1/1991 | Freitag et al. |
| 5,153,068 A | 10/1992 | Kohara et al. |
| 5,256,728 A | 10/1993 | Dardaris et al. |
| 5,693,697 A | 12/1997 | Weider et al. |
| 5,968,652 A | 10/1999 | Hanggi et al. |
| 6,841,240 B2 | 1/2005 | Gorny et al. |
| 8,092,901 B2 | 1/2012 | Gorny |
| 8,900,693 B2 | 12/2014 | van den Bogerd et al. |
| 2003/0032755 A1 | 2/2003 | Gorny et al. |
| 2007/0123634 A1 | 5/2007 | Chung et al. |
| 2008/0015292 A1* | 1/2008 | Lens ...................... C08L 69/00 524/115 |
| 2008/0058460 A1* | 3/2008 | Tonge .................... C08L 23/04 524/494 |
| 2008/0132617 A1 | 6/2008 | Eckel et al. |
| 2009/0008516 A1 | 1/2009 | Davis et al. |
| 2010/0036014 A1 | 2/2010 | Charles et al. |
| 2010/0160508 A1 | 6/2010 | Taschner et al. |
| 2011/0003918 A1 | 1/2011 | Eckel et al. |
| 2011/0143126 A1 | 6/2011 | Meyer et al. |
| 2012/0289649 A1* | 11/2012 | Wagner .................. A61K 8/893 524/588 |

FOREIGN PATENT DOCUMENTS

| DE | 19503470 A1 | 8/1996 |
| GB | 1367789 | 9/1974 |
| WO | 199626070 A1 | 8/1996 |
| WO | 2004109346 A1 | 12/2004 |
| WO | WO2004109346 | * 12/2004 |

OTHER PUBLICATIONS

Near Infrared Reflectance Properties of Metal Oxide Nanoparticles, Jeevanandam et al, J. Phys. Chem. C 2007, 111, 1912-1918.*

* cited by examiner

*Primary Examiner* — Monique R Peets
(74) *Attorney, Agent, or Firm* — John E. Mrozinski, Jr.; Richard P. Bender

(57) ABSTRACT

The present invention provides a composition comprising a polycarbonate, an infrared (IR) reflective additive and an epoxy-functional silicone, wherein the composition exhibits a reduced melt flow change over a comparable compound not containing an epoxy-functional silicone.

12 Claims, No Drawings

COMPOSITIONS CONTAINING POLYCARBONATE AND INFRARED REFLECTIVE ADDITIVES

CROSS REFERENCE TO RELATED APPLICATION

This application claims the benefit, under 35 USC § 119(e), of U.S. provisional patent application No. 61/775,759, filed Mar. 11, 2013, entitled "COMPOSITIONS CONTAINING POLYCARBONATE AND INFRARED REFLECTIVE ADDITIVES," the entire disclosure of which is hereby incorporated by reference.

FIELD OF THE INVENTION

The present invention relates in general to thermoplastics and more specifically to compositions containing polycarbonate and infrared reflective additives.

BACKGROUND OF THE INVENTION

As those skilled in the art are aware, infrared (IR) reflective additives severely degrade polycarbonate compositions resulting in drop in molecular weight and an increase in melt flow rate.

U.S. Pat. No. 5,153,068, issued to Kohara et al., describes a coated color particle with extremely low susceptibility to decoloring. The coated color particle comprises a colored core particle and a coating layer formed on the surface of the core particle, wherein the coating layer is formed by treatment of the core particle with an agent selected from the group consisting of silane compounds, silyl isocyanates, and organic titanium compounds.

Dardarts et al., in U.S. Pat. No. 5,256,728, provide pigmented polycarbonate compositions which are substantially stable with respect to molecular weight and melt viscosity and are prepared by blending a redistributed polycarbonate with titanium dioxide free from polysiloxane coatings.

U.S. Pat. No. 5,968,652, issued to Hanggi et al., discloses coated particles that are said to be well suited for use as absorption media in chromatographic processes. The coated particles comprise a substrate, such as aluminum, silicon, titanium or zirconium oxide particles, containing polymerized silane moieties on a surface of the substrate. The silane moieties include two or three olefinic groups as well as at least one useful ligand.

Gorny et al., in U.S. Pat. No. 6,841,240, describe a multilayered article made of a plastic material which exhibits high IR reflection and a high gloss. The article includes at least three layers A, B and C, wherein layer A contains a transparent thermoplastic plastics material, and wherein layer B contains a transparent thermoplastic plastics material and a pigment which consists of a transparent support material and a titanium dioxide layer of thickness 150 to 200 µm and where layer C contains a transparent thermoplastic plastics material.

U.S. Patent Application Publication No. 2003/0032755, in the name of Gorny et al. provides compositions containing a thermoplastic synthetic material and a multi-layered pigment, a method for producing products containing said compositions and to products containing the compositions, in particular, to panels containing said compositions.

A need continues to exist for polycarbonate composition containing infrared (IR) reflective additives which have improved melt flow properties.

SUMMARY OF THE INVENTION

Accordingly, the present invention provides a polycarbonate composition containing infrared (IR) reflective additives and an epoxy-functional silicone which dramatically reduces the melt flow change.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a composition comprising a polycarbonate, an infrared (IR) reflective additive and an epoxy-functional silicone, wherein the composition exhibits a reduced melt flow change over a comparable compound not containing an epoxy-functional silicone.

The present inventors have surprisingly found that the addition of an epoxy-functional silicone dramatically reduces the melt flow change in compositions containing polycarbonate and infrared (IR) reflective additives.

Non-limiting and suitable polycarbonates may comprise, for example, homopolycarbonates, copolycarbonates, branched polycarbonates, polyester carbonates, and mixtures of any thereof. The polycarbonates may have a weight average molecular weight of 10,000 g/mol to 200,000 g/mol, and in various non-limiting embodiments, of 20,000 g/mol to 80,000 g/mol, 15,000 g/mol, to 80,000 g/mol, or 24,000 g/mol to 32,000 g/mol. The polycarbonates may be thermoplastic polycarbonates. The thermoplastic polycarbonates may have a melt flow rate (determined according to ASTM D1238-04: Standard Test Method for Melt Flow Rates of Thermoplastics by Extrusion Plastometer, which is incorporated by reference herein) at 300° C. of about 1 g/10 min to about 85 g/10 min, and in various non-limiting embodiments, of about 2 g/10 min to 30 g/10 min.

The polycarbonates may be prepared, for example, by the known diphasic interface process from a carbonic acid derivative such as phosgene and a dihydroxy compound by polycondensation (see, e.g., German Offenlegungsschriften Numbers 2,063,050; 2,063,052; 1,570,703; 2,211,956; 2,211,957; 2,248,817; 2,232,877; 2,703,376; 2,714,544, 3,000,610; 3,832,396; 3,077934; and Schnell, "Chemistry and Physics of Polycarbonates," Interscience Publishers, New York, N.Y., 1964, which are all incorporated by reference herein).

In various non-limiting embodiments, the polycarbonates may comprise aromatic polycarbonates. Aromatic polycarbonates may be prepared, for example, by reaction of diphenols with carbonic acid halides, such as phosgene, and/or with aromatic dicarboxylic acid dihalides, such as benzenedicarboxylic acid dihalides, by the interfacial process, optionally using chain terminators, for example, monophenols, and optionally using branching agents that are trifunctional or more than trifunctional, for example, triphenols or tetraphenols. Production of aromatic polycarbonates via a melt polymerization process by reaction of diphenols with, for example, diphenyl carbonate is likewise possible.

In certain embodiments, the polycarbonates may be prepared from dihydroxy compounds that conform to the structural formula (1) or (2):

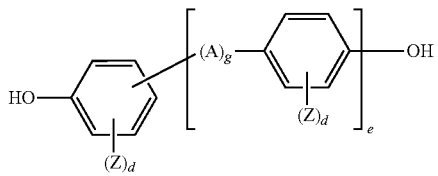
(1)

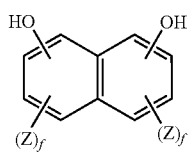
(2)

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO—, —SO$_2$—, or a radical conforming to formula (3):

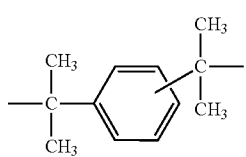
(3)

wherein e and g both denote the number 0 to 1; Z denotes F, Cl, Br or $C_1$-$C_4$-alkyl, and if several Z radicals are substituents in one aryl radical, they may be identical or different from one another; d denotes an integer of from 0 to 4; and f denotes an integer of from 0 to 3.

Non-limiting dihydroxy compounds that may be used to produce polycarbonates include, for example, hydroquinone; resorcinol; bis-(hydroxyphenyl)-alkanes; bis-(hydroxyphenyl)-ethers; bis-(hydroxyphenyl)-ketones; bis-(hydroxyphenyl)-sulfoxides; bis-(hydroxyphenyl)-sulfides; bis-(hydroxyphenyl)-sulfones; 2,2,4-trimethylcyclohexyl-1,1-diphenol; α,α'-bis-(hydroxyphenyl)-diisopropylbenzenes; nuclear-alkylated derivatives thereof; and combinations of any thereof. Additional aromatic dihydroxy compounds that may be used to produce polycarbonates are described, for example, in U.S. Pat. Nos. 3,028,356; 2,999,835; 3,148,172; 2,991,273; 3,271,367; and 2,999,846, which are all incorporated by reference herein.

In certain embodiments, polycarbonates may be prepared from one or more bisphenol compounds. For example, polycarbonates may be prepared from bisphenol compounds including, but not limited to, 2,2-bis-(4-hydroxyphenyl)-propane (bisphenol A); 2,4-bis-(4-hydroxyphenyl)-2-methylbutane; 1,1-bis-(4-hydroxyphenyl)-cyclohexane; α,α'-bis-(4-hydroxyphenyl)-p-diisopropylbenzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulfide; bis-(3,5-dimethyl-4-hydroxyphenyl)-sulfoxide; bis-(3,5-dimethyl-4-hydroxyphenyl)-sulfone; dihydroxybenzophenone; 2,4-bis-(3,5-dimethyl-4-hydroxyphenyl)-cyclohexane; α,α'-bis-(3,5-dimethyl-4-hydroxyphenyl)-p-diisopropylbenzene; 2,2,4-trimethyl cyclohexyl-1,1-diphenol; 4,4'-sulfonyl diphenol; 2,2-bis-(3,5-dibromo-4-hydroxyphenyl)-propane; and combinations of any thereof.

In various non-limiting embodiments, polycarbonates may be prepared from at least one of 2,2,-bis-(4-hydroxyphenyl)-propane; 2,2-bis-(3,5-dibromo-4-hydroxyphenyl)-propane; 2,2-bis-(3,5-dimethyl-4-hydroxyphenyl)-propane; 2,2,4-trimethyl cyclohexyl-1,1-diphenol; and 1,1-bis-(4-hydroxyphenyl)-cyclohexane. The polycarbonates may include residue units in their structure derived from one or more bisphenol compounds.

In addition, polycarbonate resins may be used. The polycarbonate resins may include, for example, phenolphthalein-based polycarbonates, copolycarbonates, and terpolycarbonates, such as are described in U.S. Pat. Nos. 3,036,036 and 4,210,741, which are both incorporated by reference herein.

In certain embodiments, branched polycarbonates may be used. Branched polycarbonates may be produced, for example, by reacting via polycondensation a carbonic acid derivative such as phosgene, one or more dihydroxy compounds, and one or more polyhydroxyl compounds that function as branching agents. Branching agents that may be used include, for example, phenols that are trifunctional or more than trifunctional, such as phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis[4,4-bis-(4-hydroxyphenyl)-cyclohexyl]-propane; 2,4-bis-(4-hydroxyphenyl-isopropyl)-phenol; tetra-(4-hydroxyphenyl)-methane; 2,6-bis-(2-hydroxy-methyl-benzyl)-4-methyl-phenol; 2-(4-hydroxyphenyl)-2-(2,4-dihydroxyphenyl)-propane; tetra-(4-[4-hydroxyphenyl-isopropyl]-phenoxy)-methane; 1,4-bis-[4',4''-dihydroxytriphenyl)-methyl]-benzene; combinations of any thereof. Multifunctional phenols may be used in amounts of from 0.01 mol % to 1.0 mol % based on the total amount of phenols employed. Multi-functional phenolic branching agents may be introduced with diphenols into reaction mixtures during polycarbonate synthesis.

In various non-limiting embodiments, at least one polyhydroxyl compound may be reacted with a carbonic acid derivative and at least one dihydroxy compound in relatively small quantities, such as, for example, 0.05 mol % to 2.00 mol % (relative to the dihydroxy compounds present in the reaction mixture). Branched polycarbonates of this type are described, for example, in German Offenlegungsschriften Nos. 1,570,533; 2,116,974; and 2,113,374; British Patent Nos. 885,442 and 1,079,821; and U.S. Pat. No. 3,544,514, which are all incorporated by reference herein.

Non-limiting examples of polyhydroxyl compounds that may be used in various embodiments to prepare branched polycarbonates include, but are not limited to, phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxy-phenyl)-propane; 1,4-bis-(4,4'-dihydroxy-triphenylmethyl)-benzene; and combinations of any thereof. Non-limiting examples of other polyfunctional compounds that may be used to prepare branched polycarbonates include, but are not limited to, 2,4-dihydroxybenzoic acid; trimesic acid; cyanuric chloride; 3,3-bis-(4-hydroxyphenyl)-2-oxo-2,3-dihydroindole; and combinations of any thereof.

Chain terminators that may be used for the preparation of polycarbonates include, for example, phenol; p-chlorophenol; p-tert-butylphenol; 2,4,6-tribromophenol; and combinations of any thereof. Chain terminators that may also be used for the preparation of polycarbonates include alkylphenols such as, for example, 4-[2-(2,4,4-trimethylpentyl)]-phenol; 4-(1,3-tetramethylbutyl)-phenol; 3,5-di-tert-butylphenol; p-iso-octylphenol; p-tert-octylphenol; p-dodecylphenol; 2-(3,5-dimethylheptyl)-phenol; 4-(3,5-dimethylheptyl)-phenol; and combinations of any thereof. The amount of chain terminators employed may be between 0.5 mol percent and 10 mol percent, based on the total amount of phenols and diphenols employed in the polycarbonate synthesis.

Polyester carbonates may be prepared, for example, by co-reacting a carbonic acid derivative such as phosgene, a dihydroxy compound, and a dicarboxylic acid dihalides. Examples of suitable dicarboxylic acid dihalides include, for example, the diacid dichlorides of isophthalic acid; terephthalic acid; diphenyl ether 4,4'-dicarboxylic acid; and of naphthalene-2,6-dicarboxylic acid. Mixtures of any of these dicarboxylic acid dihalides are also suitable. For example, mixtures of the diacid dichlorides of isophthalic acid and of terephthalic acid in a ratio of between 1:20 and 20:1, or any sub-range subsumed therein, may be employed.

Branching agents that may be used to produce branched polyester carbonates include, for example, carboxylic acid chlorides that are trifunctional or more than trifunctional, such as trimesic acid trichloride; cyanuric acid trichloride; 3,3',4,4'-benzophenone-tetracarboxylic acid tetra-chloride; 1,4,5,8-naphthalenetetracarboxylic acid tetrachloride; pyromellitic acid tetrachloride; or combinations of any thereof. Carboxylic acid chlorides may be used in amounts of from 0.01 mol % to 1.0 mol % based on the total amount of carboxylic acid chlorides employed. Multi-functional acid chloride branching agents may be introduced with acid dichlorides into reaction mixtures during polyester carbonate synthesis.

Examples of chain terminators suitable for the preparation of polyester carbonates include, in addition to the monophenols already mentioned, chlorocarbonic acid esters thereof and the acid chlorides of aromatic monocarboxylic acids, which can optionally be substituted by $C_1$-alkyl to $C_{22}$-alkyl groups or by halogen atoms, and aliphatic $C_2$- to $C_{22}$-monocarboxylic acid chlorides. The amount of chain terminators in each case may be 0.1 mol % to 10 mol %, based on the moles of diphenol in the case of the phenolic chain terminators and on the moles of dicarboxylic acid dichloride in the case of monocarboxylic acid chloride chain terminators.

The content of carbonate structural units in a polyester carbonate may vary. For example, the content of carbonate groups may be up to 100 mol %, and in various embodiments, up to 80 mol % or up to 50 mol %, based on the sum of ester groups and carbonate groups. Both the ester and the carbonate content of a polyester carbonate can be present in the polycondensate molecule in the form of blocks or in random distribution.

In addition to general polycondensation processes, other reaction processes that may be used to prepare polycarbonates include, for example, transesterification, modified polycondensation in a homogeneous phase, and interfacial polycondensation. Non-limiting examples of these and other processes for producing polycarbonates are described in U.S. Pat. Nos. 3,028,365; 2,999,846; 3,153,008; 2,991,273; and 3,912,688, which are incorporated by reference herein.

The reactants described above for the production of polycarbonates may be employed in any suitable reaction mixture to produce homopolycarbonates, copolycarbonates, branched polycarbonates, or polyester carbonates. The resulting polycarbonate products may be used in polycarbonate compositions by themselves or in any suitable mixture.

In various non-limiting embodiments, commercially-available polycarbonate resins may be used in polycarbonate compositions. Non-limiting examples of suitable polycarbonate resins include, for example, the bisphenol-based polycarbonate resins available from Bayer MaterialScience under the MAKROLON name. Additional polycarbonate resins that may be used in various non-limiting embodiments are described, for example, in U.S. Pat. Nos. 3,030,331; 3,169,121; 3,395,119; 3,729,447; 4,255,556; 4,260,731; 4,369,303; 4,714,746; 5,693,697, which are all incorporated by reference herein, and in U.S. Patent Application Publications Nos. 2007/0123634; 2008/0132617; 2009/008516; 2010/0160508; and 2011/0003918, which are also incorporated by reference herein.

Polycarbonate compositions in accordance with the various embodiments described in this specification may contain additional optional polymers and additives known to those in the art, such as, for example, polyesters, ABS, antioxidants, UV absorbers, light absorbers, peroxide scavengers, metal deactivators, fillers and reinforcing agents, impact modifiers, lubricants, plasticizers, optical brighteners, pigments, dyes, colorants, flame-retarding agents, anti-static agents, mold-release agents, blowing agents, and combinations of any thereof. For example, a composition may comprise one or more flame retardants (e.g., organic phosphorus or halogen compounds, such as bisphenol A-based oligophosphates, tetrabromobisphenol A carbonate oligomers, bisphenol A diphosphate, or other organic esters of phosphoric acid); anti-drip agents (e.g., fluorinated polyolefins such as PTFE, silicones, and aramid fibers); lubricants and mold release agents (e.g., pentaerythritol tetrastearate); antioxidants and, stabilizers (e.g., triphenylphosphine or the antioxidants/thermal stabilizers available under the IRGANOX name); nucleating agents; antistatic agents (e.g., conductive carbon blacks, carbon fibers, carbon nanotubes, and organic antistatics such as polyalkylene ethers, alkylsulfonates, or polyamide-containing polymers); fillers and reinforcing materials other than glass fibers, alumina, and wollastonite (e.g., talc, mica, or kaolin); dyes and pigments (e.g., titanium dioxide or iron oxide); impact modifiers (e.g., silicon rubbers and derivatives thereof such as the METABLEN products); and combinations of any thereof.

Highly epoxy-functional silicone fluids containing epoxy alkyl groups bound to silicon atoms by means of non-hydrolysable spacers are useful in the present invention for dramatically reducing the melt flow change in the polycarbonate composition containing IR additives. Cyclic, linear and branched polydimethylsiloxanes having a viscosity of 0.65-200,000,000 mPas at 25° C. and mixtures thereof, such as e.g. octaorganocyclotetrasiloxanes, octamethylcyclotetrasiloxanes, decaorganocyclopentasiloxanes and dodecaorganocyclohexasiloxanes, wherein the organic residue preferably denotes methyl, such as SF 1173, SF 1202, SF 1217, SF 1204 and SF 1258 from GE Bayer Silicones, dimethicones, such as the BAYSILONE M oils (M3 to M 2,000,000), SE 30, SF 1214, SF 1236, SF 1276 and CF 1251 from Momentive Performance Materials, and dimethiconols, such as BAYSILONE adhesive ZWTR/OH, i.e.

SiOH-terminated polydimethylsiloxanes 2-20 kPas from Momentive Performance Materials and DC 1501 and DC 1503 from Dow Corning. Solid silicones, so-called MQ resins, such as e.g. SR 1000 from Momentive Performance Materials, and solutions thereof in solvents, such as the above-mentioned silicones and aliphatic solvents, such as e.g. isododecane, are also suitable.

Organofunctional silicones, such as alkyl-, aryl-, arylalkyl-, phenyl-, fluoroalkyl- and polyether-modified silicones, such as the types SF 1632, SF 1642, SF 1555, BAYSILONE CF 1301, BAYSILONE PK 20, FF 157, SF 1188A, SF 1288 and SF 1388 from Momentive Performance Materials, are also suitable.

BAYSILONE OF EP 901 is particularly preferred.

The infrared reflective pigment can be colored or essentially colorless, translucent or opaque. As used herein, the term "essentially colorless" means that the pigment does not have a color, i.e., the absorption curve for the pigment is devoid of absorption peaks in the 400-700 nm range and does not present a tint or hue in reflected or transmitted light when viewed under sunlight. A colored infrared reflective pigment is an infrared reflective pigment that is not essentially colorless. Stated differently, a "colored" infrared reflective pigment is one that may be visibly absorbing, as defined below. A "translucent" pigment means that visible light is able to pass through the pigment diffusely. An "opaque" pigment is one that is not translucent. One example of an infrared reflective pigment that can be translucent and essentially colorless (if used in small enough amounts in a coating) is SOLARFLAIR 9870 pigment commercially available from Merck KGaA of Darmstadt, Germany. This commercially available pigment is also an example of an interference pigment (described below) that comprises a mica substrate that is coated with titanium dioxide.

Examples of suitable colored and/or opaque infrared-reflective pigments include, for example, any of a variety of metals and metal alloys, inorganic oxides, and interference pigments. Exemplary colors include, for example, white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; blue and violet, as is the case with certain $TiO_2$ coated mica flakes.

Suitable metals and metal alloys include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel nobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

Often, such pigments are in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. In some case, such flakes can have a coating deposited thereon, such as is the case with silica coated copper flakes.

In certain embodiments, such thin flake particles have a thickness of less than 0.05 µm to 10 µm, such as 0.5 to 5 µm. In certain embodiments, such thin flake particles have a maximum width of 10 to 150 µm, such as 10 to 30 µm.

In certain embodiments, the thin flake particles comprise rounded edges and a smooth and flat surface, as opposed to jagged edges. Flakes having angular edges and uneven surfaces are known in the art as "cornflakes". On the other hand, flakes distinguished by more rounded edges, smoother, flatter surfaces are referred to as "silver dollar" flakes.

Moreover, in certain embodiments, the thin flake metal or metal alloy particles comprising rounded edges have a maximum width of no more than 25 µm, such as 10 to 15 µm, when measured according to ISO 1524.

Additional suitable metal pigments include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which being incorporated herein by reference. Some such colored metallic pigments are also commercially available and include those available from U.S. Aluminum, Inc., Flemington, N.J., under the tradename FIREFLAKE. In certain embodiments, an infrared transparent pigment, such as the perylene-based pigments described below, can be chemically adsorbed on the surface of the metallic pigment, to provide a dark, sometimes black, colored infrared reflective metallic pigment.

Suitable inorganic oxide containing infrared reflective pigments include, for example, iron oxide, titanium oxide ($TiO_2$) pigment, composite oxide system pigments, titanium oxide-coated mica pigment, iron oxide-coated mica pigment, and zinc oxide pigment, among many others.

In certain embodiments, the infrared reflective pigment exhibits greater reflectivity in the near-infrared wavelength region (700 to 2500 nm) than it does in the visible region (400 to 700 nm). In certain embodiments, the ratio of reflectivity in the near-infrared region to the reflectivity in the visible region is greater than 1:1, such as at least 2:1, or, in some cases, at least 3:1. Certain interference pigments are examples of such infrared reflective pigments.

As used herein, the term "interference pigment" refers to a pigment having a multi-layer structure having alternating layers of material of different refractive index. Suitable light-interference pigments include, for example, pigments comprising a substrate of e.g. mica, $SiO_2$, $Al_2O_3$, $TiO_2$ or glass that is coated with one or more layers of e.g. titanium dioxide, iron oxide, titanium iron oxide or chrome oxide or combinations thereof, or pigments comprising combinations of metal and metal oxide, such as aluminum coated with layers of iron oxide layers and/or silicon dioxide.

In certain embodiments, the infrared reflective pigment is present in the thermoplastic composition in an amount of at least 1% by weight, at least 2% by weight, at least 3% by weight, or, in some cases, at least 5% by weight, at least 6% by weight, or at least 10% by weight, based on the total weight of the composition. In certain embodiments, the infrared reflective pigment is present in the foregoing composition in an amount of no more than 50% by weight, no more than 25% by weight, or, in some cases, no more than 15% by weight, based on the total weight of the composition. Often, the infrared reflective pigment is present in the foregoing coating composition in an amount greater than 5% by weight, based on the total weight of the composition, such as greater than 5% to 15% by weight, based on the total weight of the composition.

EXAMPLES

The present invention is further illustrated, but is not to be limited, by the following examples. All quantities given in "parts" and "percents" are understood to be by weight, unless otherwise indicated.

In the preparation of exemplified compositions, the components and additives as given in the Tables were melt compounded in a twin screw extruder ZSK 30 at a temperature profile from 200° C. to 300° C. The reported melt volume-flow rates (MVR) of the compositions reported in the Tables were determined in accordance with ASTM D-1238. In the tables, "30 min. dwell" means that the resin was held at the foresaid temperature (300° C.) for 30 min.

| | |
|---|---|
| PC | a bisphenol-A based, linear homopolycarbonate having melt flow rate of about 4 g/10 min. (at 300° C.-1200 g load) per ASTM D 1238 |
| Stabilizer-1 | hydroxyl aluminum oxide, commercially available from Sasol North America Inc. as PURAL 200; |
| Stabilizer-2 | Bis (2,4-di-t-butylphenyl) Pentraerythritol Diphosphite, commercially available from Chemtura Corporation as ULTRANOX 626A; |
| OIL | a highly epoxy-functional silicone fluid containing epoxy alkyl groups bound to silicon atoms by means of non-hydrolysable spacers commercially available from Momentive Performance Materials Inc. as BAYSILONE OF EP 901; |
| STABILIZER-3 | polycarbodiimide commercially available from RheinChemie as STABAXOL P 66/D; |
| IR ADDITIVE A | an infrared reflective pigment commercially available from Merck KGaA as SOLARFLAIR 9875; and |
| IR ADDITIVE B | an infrared reflective pigment commercially available from Merck KGaA as SOLARFLAIR 9870. |

TABLE I

| | Ex. C1 | Ex. 2 | Ex. 3 | Ex. 4 | Ex. 5 | Ex. 6 | Ex. 7 |
|---|---|---|---|---|---|---|---|
| PC | 100 | 85 | 85 | 85 | 85 | 85 | 85 |
| OIL | | | 1 | | 1 | | |
| STABILIZER-3 | | | | 0.5 | 0.5 | | |
| IR ADDITIVE A | | 15 | 15 | 15 | 15 | 15 | 15 |
| Stabilizer-2 | | | | | | 0.5 | |
| Stabilizer-1 | | | | | | | 0.5 |
| MVR, 300° C./1.2 kg | 4 | 69.87 | 4.88 | 74.64 | 5.99 | 67.8 | 74.98 |
| MVR, 300° C./1.2 kg, 30 min. dwell | | | 6.03 | | 11.29 | | |

As is apparent by reference to Table I, the polycarbonate composition containing an IR additive and the highly epoxy-functional silicone fluid has a dramatically reduced melt flow change (compare Ex. 2 with Ex. 3; Ex. 4 with Ex. 5). This effect is also observed with another IR additive as illustrated in Table II.

TABLE II

| | Ex. 8 | Ex. 9 |
|---|---|---|
| PC | 85 | 85 |
| OIL | | 1 |
| IR ADDITIVE B | 15 | 15 |
| MVR, 300° C./1.2 kg | 49.40 | 4.98 |
| MVR, 300° C./1.2 kg, 30 min dwell | 70.64 | 7.50 |

The molding compositions of the present invention may be used for the production of shaped articles of all kinds. Examples of shaped articles include, for example, films, sheets, profiles, all kinds of housing parts (e.g. for domestic appliances such as juice presses, coffee machines, mixers; for office equipment such as monitors, flat screens, notebooks, printers, copiers; pipes, electrical installation ducts, windows, doors and other profiles for the construction sector), interior finishing and exterior applications, electrical and electronic parts (e.g., switches, plugs, and sockets), and components for utility vehicles, particularly for the automobile sector. The molding compositions may also be suitable for the production of shaped articles or molded parts including, for example, interior fittings for rail vehicles, ships, aircraft, buses, and other motor vehicles; body parts for motor vehicles; housings for electrical appliances containing small transformers; housings for equipment for data processing and transfer; housings and claddings for medical equipment; massage equipment and housings therefore; toy vehicles for children; flat wall elements; housings for safety devices; thermally insulated transport containers; moldings for sanitary and bath equipment; covering grid plates for ventilation openings; and housings for garden equipment.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

Various aspects of the subject matter described herein are set out in the following numbered clauses:

1. A thermoplastic composition comprising: a polycarbonate; an infrared (IR) reflective additive; and an epoxy-functional silicone, wherein the composition exhibits a reduced melt flow change over a comparable compound not containing an epoxy-functional silicone.

2. The composition according to clause 1, wherein the infrared (IR) reflective additive is present in the thermoplastic composition in an amount of at least 1% by weight based on the total weight of the composition.

3. The composition according to clause 1, wherein the infrared (IR) reflective additive is present in the thermoplastic composition in an amount of at least 2% by weight based on the total weight of the composition.

4. The composition according to clause 1, wherein the infrared (IR) reflective additive is present in the thermoplastic composition in an amount of at least 3% by weight based on the total weight of the composition.

5. The composition according to clause 1, wherein the infrared (IR) reflective additive is present in the thermoplastic composition in an amount of at least 5% by weight based on the total weight of the composition.

6. The composition according to clause 1, wherein the infrared (IR) reflective additive is present in the thermoplastic composition in an amount of at least 6% by weight based on the total weight of the composition.

7. The composition according to clause 1, wherein the infrared (IR) reflective additive is present in the thermoplastic composition in an amount of at least 10% by weight based on the total weight of the composition.

8. The composition according to clause 1, wherein the infrared (IR) reflective additive is present in the thermoplastic composition in an amount of no more than 50% by weight based on the total weight of the composition.

9. The composition according to clause 1, wherein the infrared (IR) reflective additive is present in the thermoplastic composition in an amount of no more than 25% by weight based on the total weight of the composition.

10. The composition according to clause 1, wherein the infrared (IR) reflective additive is present in the thermoplastic composition in an amount of no more than 15% by weight based on the total weight of the composition.

11. The composition according to clause 1, wherein the infrared (IR) reflective additive is present in the thermoplastic composition in an amount of greater than 5% by weight to 15% by weight based on the total weight of the composition.

12. The composition according to clause 1, wherein the infrared (IR) reflective additive is selected from the group consisting of nickel antimony titanium, nickel nobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, and combinations thereof.

What is claimed is:

1. A thermoplastic composition comprising:
a polycarbonate;
an infrared (IR) reflective additive; and
an epoxy-functional silicone,
wherein the composition exhibits a reduced melt flow change over a comparable compound not containing an epoxy-functional silicone.

2. The composition according to claim 1, wherein the infrared (IR) reflective additive is present in the thermoplastic composition in an amount of at least 1% by weight based on the total weight of the composition.

3. The composition according to claim 1, wherein the infrared (IR) reflective additive is present in the thermoplastic composition in an amount of at least 2% by weight based on the total weight of the composition.

4. The composition according to claim 1, wherein the infrared (IR) reflective additive is present in the thermoplastic composition in an amount of at least 3% by weight based on the total weight of the composition.

5. The composition according to claim 1, wherein the infrared (IR) reflective additive is present in the thermoplastic composition in an amount of at least 5% by weight based on the total weight of the composition.

6. The composition according to claim 1, wherein the infrared (IR) reflective additive is present in the thermoplastic composition in an amount of at least 6% by weight based on the total weight of the composition.

7. The composition according to claim 1, wherein the infrared (IR) reflective additive is present in the thermoplastic composition in an amount of at least 10% by weight based on the total weight of the composition.

8. The composition according to claim 1, wherein the infrared (IR) reflective additive is present in the thermoplastic composition in an amount of no more than 50% by weight based on the total weight of the composition.

9. The composition according to claim 1, wherein the infrared (IR) reflective additive is present in the thermoplastic composition in an amount of no more than 25% by weight based on the total weight of the composition.

10. The composition according to claim 1, wherein the infrared (IR) reflective additive is present in the thermoplastic composition in an amount of no more than 15% by weight based on the total weight of the composition.

11. The composition according to claim 1, wherein the infrared (IR) reflective additive is present in the thermoplastic composition in an amount of greater than 5% by weight to 15% by weight based on the total weight of the composition.

12. The composition according to claim 1, wherein the infrared (IR) reflective additive is selected from the group consisting of nickel antimony titanium, nickel nobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, and combinations thereof.

* * * * *